(12) United States Patent
Sun et al.

(10) Patent No.: US 12,370,651 B2
(45) Date of Patent: Jul. 29, 2025

(54) CLAMPING SYSTEM AND ADAPTIVE CLAMPING METHOD FOR TURNING OF THIN-WALLED CURVED COMPONENTS

(71) Applicant: DALIAN UNIVERSITY OF TECHNOLOGY, Liaoning (CN)

(72) Inventors: Yuwen Sun, Liaoning (CN); Shuyang Yan, Liaoning (CN); Shutao Qi, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/563,542

(22) PCT Filed: Feb. 3, 2023

(86) PCT No.: PCT/CN2023/074343
§ 371 (c)(1),
(2) Date: Nov. 22, 2023

(87) PCT Pub. No.: WO2024/124671
PCT Pub. Date: Jun. 20, 2024

(65) Prior Publication Data
US 2025/0073856 A1    Mar. 6, 2025

(30) Foreign Application Priority Data

Dec. 13, 2022 (CN) .......................... 202211601922.9

(51) Int. Cl.
*B25B 11/00* (2006.01)

(52) U.S. Cl.
CPC .................. *B25B 11/005* (2013.01)

(58) Field of Classification Search
CPC .................................................. B25B 11/005
See application file for complete search history.

(56) References Cited

U.S. PATENT DOCUMENTS 5,564,682 A * 10/1996 Tsuji .................... H01L 21/6838
269/21
5,634,749 A * 6/1997 Edis ...................... B25B 11/005
269/21

(Continued)

FOREIGN PATENT DOCUMENTS

CN    103264303 A    8/2013
CN    107695735 A    2/2018

(Continued)

*Primary Examiner* — Kyle A Cook
(74) *Attorney, Agent, or Firm* — Muncy, Geissler, Olds & Lowe, P.C.

(57) ABSTRACT

The present invention discloses a clamping system and an adaptive clamping method for turning of thin-walled curved components. A curved component is positioned and clamped on the upper surface of the vacuum adsorption fixture, and a rubber sealing ring on an auxiliary support of the fixture is in contact with the inner contour of the curved surface to separate the closed space in the component into three independent adsorption force action areas: a flange end surface, a first vacuum chamber and a second vacuum chamber; and three independent vacuum channels are arranged in the fixture, the vacuum channels are communicated with sub-circuits through pneumatic hoses, and the on-off of the circuits is controlled by electromagnetic directional valves. The vacuum adsorption clamping system with multiple clamping modes can be adaptively adjusted according to the process stage of curved components.

6 Claims, 5 Drawing Sheets

(56) References Cited

U.S. PATENT DOCUMENTS

| | | | | |
|---|---|---|---|---|
| 2010/0013169 A1* | 1/2010 | Monteen | ............. | H01L 21/6838 |
| | | | | 279/3 |
| 2018/0193983 A1* | 7/2018 | Ishino | ................. | H01L 21/6838 |
| 2019/0164803 A1* | 5/2019 | Wu | ........................ | B25B 11/005 |
| 2019/0371646 A1* | 12/2019 | Liao | ..................... | H01L 21/6838 |
| 2021/0185867 A1* | 6/2021 | Irie | ....................... | F04B 49/225 |
| 2021/0247178 A1* | 8/2021 | Zeng | .................... | G01B 5/0004 |
| 2023/0082322 A1* | 3/2023 | Senshu | ................. | B25B 11/005 |
| | | | | 264/259 |

FOREIGN PATENT DOCUMENTS

| | | | | |
|---|---|---|---|---|
| CN | 109318013 A | | 2/2019 | |
| CN | 208528614 U | | 2/2019 | |
| CN | 111702532 A | | 9/2020 | |
| CN | 112676891 A | | 4/2021 | |
| CN | 114871801 A | | 8/2022 | |
| GB | 1391758 A | | 4/1975 | |
| JP | 60127935 A | * | 7/1985 | ........... B25B 11/005 |
| JP | 60146673 A | * | 8/1985 | ............. B24B 37/30 |
| JP | H10-138071 A | | 5/1998 | |
| SU | 1234057 A1 | | 5/1986 | |
| WO | WO-2012/132773 A1 | | 10/2012 | |
| WO | WO-2021/189278 A1 | | 9/2021 | |

\* cited by examiner

Section A-A

Section B-B

Section C-C

Mode 1: Adsorption in first vacuum chamber

Mode 2: Adsorption in second vacuum chamber

Mode 3: Adsorption in flange end surface

CLAMPING SYSTEM AND ADAPTIVE CLAMPING METHOD FOR TURNING OF THIN-WALLED CURVED COMPONENTS

TECHNICAL FIELD

The present invention belongs to the technical field of clamping for turning of thin-walled curved components, and particularly relates to a vacuum adsorption clamping system and an adaptive clamping method.

BACKGROUND

A series of weakly rigid thin-walled curved components used in the fields such as energy power and aerospace are deformed severely and complicatedly in form due to small wall thickness and large contour size as well as comprehensive influence of internal stress of the material, clamping stress and residual machining stress during machining. The clamping device with clamping and positioning functions not only directly affects the clamping deformation of thin-walled components, but also restricts the release of unbalanced stress during removal of the residual material, resulting in poor machining precision of thin-walled curved components after unclamping.

In order to improve the turning precision of thin-walled curved components, the vacuum adsorption clamping method is often used to replace traditional mechanical clamping methods. The method uses the pressure difference between the vacuum chambers in the fixture and the atmosphere to press thin-walled curved components on the surface of the fixture, which has the advantages of simple operation and reliable clamping. A patent for invention CN111702532A discloses "a clamping method for thin-walled components and a fixture", which realizes adsorption clamping in the flange end surface of a curved component by optimizing the positions of annular groove air passages of the fixture and avoids large clamping deformation caused by direct adsorption of the revolution surface of the curved component. A patent for invention CN112676891A discloses "a split-type self-aligning device for high-precision machining and a self-aligning method therefor", which fixes a thin-walled curved component on the clamping seat of the self-aligning device by means of adsorption clamping in the flange end surface and adjusts the relative position between the clamping seat and the base by an optical adjusting threaded part, so as to complete the precise aligning operation of the weakly rigid curved component indirectly.

The existing technical solution reduces the clamping deformation of thin-walled curved members mainly by means of adsorption clamping in the flange end surface, which enhances the constraint effect of the clamping boundary on the release of unbalanced stress and aggravates the excessive deformation of the curved components after unclamping. The machining precision of thin-walled curved components is affected by both residual stress and clamping stress. However, with the increase of material removal of the components, the resulting unbalanced stress gradually accumulates. In this case, the machining deformation induced by residual stress has more significant influence on the forming precision of the components, which indicates that in different machining stages, the main problems affecting the machining precision of thin-walled curved components are different, and the demands for clamping devices are also different or even opposite. At present, the vacuum adsorption device with fixed clamping mode and single function cannot meet the differentiated clamping demands of thin-walled curved components in different turning stages.

SUMMARY

In view of the defects in the prior art, the present invention provides a clamping system and an adaptive clamping method for turning of curved components, so as to solve the problem that the existing vacuum adsorption clamping device is difficult to meet the optimal clamping demand of curved components in different process stages.

The technical solution of the present invention is as follows:

A clamping system for turning of thin-walled curved components, comprising a pneumatic circuit, a vacuum adsorption fixture and an electromagnetic control circuit;

The pneumatic circuit comprises a main circuit and five sub-circuits, and the main circuit comprises a vacuum pump 1, an adjustable throttle valve 2 and a pressure gage 5 connected in sequence through pneumatic hoses, and an unloading valve 3 and a muffler 4 connected in sequence are connected in parallel between the vacuum pump 1 and the adjustable throttle valve 2; and the five sub-circuits are a first sub-circuit, a second sub-circuit, a third sub-circuit, a fourth sub-circuit and a fifth sub-circuit which are respectively controlled by a first electromagnetic directional valve 6, a second electromagnetic directional valve 9, a third electromagnetic directional valve 7, a fourth electromagnetic directional valve 10 and a fifth electromagnetic directional valve 8, and the five sub-circuits are independent of each other and are connected with the main circuit through ferrule joints;

The surface of the vacuum adsorption fixture 11 is provided with three vacuum annular grooves, which are a first vacuum annular groove 113, a third vacuum annular groove 115 and a second vacuum annular groove 114 from outside to inside; a first vertical air passage 117, a second vertical air passage 118, a third vertical air passage 119, a first horizontal air passage 120, a second horizontal air passage 121 and a third horizontal air passage 122 are arranged in the vacuum adsorption fixture 11, wherein the axis of the second vertical air passage 118 coincides with the rotation axis of the vacuum adsorption fixture 11, and the first vertical air passage 117 and the third vertical air passage 119 are respectively located on both sides of the second vertical air passage 118; the axis of the second horizontal air passage 121 intersects with and is perpendicular to the rotation axis of the vacuum adsorption fixture 11, and the first horizontal air passage 120 and the third horizontal air passage 122 are respectively located on both sides of the second horizontal air passage 121; the axis of each vertical air passage intersects with and is perpendicular to the axis of the corresponding horizontal air passage; both ends of the horizontal air passages are sealed with plugs and respectively communicated with the corresponding vacuum annular grooves and vertical air passages, so as to form three sealed vacuum channels in the adsorption fixture; the first vertical air passage 117 is communicated with the fifth sub-circuit, the second vertical air passage 118 is respectively communicated with the first sub-circuit and the third sub-circuit, and the third vertical air passage 119 is respectively communicated with the second sub-circuit and the fourth sub-circuit; and the upper surface of the vacuum adsorption fixture 11 is provided with an auxiliary support 124 and mounting holes 116, and trimming screw holes 123 are circumferentially and uniformly distributed on the side surface, wherein a rubber sealing ring 13 is adhered to the upper surface of the auxiliary support 124.

The electromagnetic directional valves are normally closed two-position two-way valves.

The ferrule joints are made of stainless steel.

The tail ends of the vertical air passages are provided with pipe threads and connected with each sub-circuit through pneumatic rotary joints.

The first sub-circuit and the third sub-circuit are connected together through a three-way ferrule joint.

The second sub-circuit and the fourth sub-circuit are connected together through a three-way ferrule joint.

An adaptive clamping method for turning of thin-walled curved components, comprising the following steps:

Step 1: action analysis of the vacuum adsorption clamping system; the thin-walled curved component 12 is placed on the upper surface of the vacuum adsorption fixture 11, the vacuum negative pressure of the vacuum adsorption system is adjusted to 0.02-0.03 Mpa, the runout of the thin-walled curved component 12 is adjusted to a preset value at the current vacuum degree, and then the vacuum negative pressure of the system is increased to 0.04-0.05 Mpa, so as to fix the thin-walled curved component 12 on the vacuum adsorption fixture 11; at this moment, the rubber sealing ring 13 on the auxiliary support 124 is in contact with the inner surface of the thin-walled curved component 12 to separate the closed space formed by the inner surface of the thin-walled curved component 12 and the upper surface of the vacuum adsorption fixture 11 into two non-conductive sealed vacuum chambers, wherein the vacuum chamber away from the flange is a first vacuum chamber 111, and the vacuum chamber near the flange is a second vacuum chamber 112; and the adsorption in the first vacuum chamber is defined as a clamping mode 1, the adsorption in the second vacuum chamber is defined as a clamping mode 2, and the adsorption in the flange end surface is defined as a clamping mode 3;

In the semi-precision machining stage, the clamping mode 1 and the clamping mode 2 are selected as the clamping scheme of the thin-walled curved component 12 in the current process stage; when the tool cuts the outer contour of the curved component corresponding to the second vacuum chamber 112, the clamping mode 1 is started, and the first vacuum chamber 111 is adsorbed to complete the positioning and clamping of the thin-walled curved component 12; similarly, when the tool cuts the outer contour of the curved component corresponding to the first vacuum chamber 111, the clamping mode 2 is started, and the second vacuum chamber 112 is adsorbed to complete the positioning and clamping of the thin-walled curved component 12; and the cutting durations of the tool in the above two cases are calculated as T1 and T2 respectively according to the geometry of the thin-walled curved component 12 and the cutting parameters;

In the precision machining stage, the clamping mode 3 is selected as the clamping scheme of the thin-walled curved component 12 in the current process stage; and at this moment, the residual material to be removed is less, and the machining deformation induced by the release of unbalanced stress after unclamping has less influence on the forming precision of the curved component, so a method of flange adsorption clamping is used to reduce the vacuum adsorption clamping deformation of the thin-walled curved component 12;

After the machining is completed, the unloading valve 3 is opened to let air enter through the muffler 4 and finally fill the whole vacuum adsorption fixture 11 through the adjustable throttle valve 2, then the thin-walled curved component 12 is removed, and the vacuum system is closed;

Step 2: design of the electromagnetic control circuit of the vacuum adsorption clamping system; the electromagnetic control circuit of the vacuum adsorption clamping system is composed of eight branches connected in parallel in a 24 VDC power source, wherein the first branch is composed of a normally closed contact C2, an electromagnetic coil Y1 and an indicator light L1 connected in series; the second branch is composed of a normally closed contact C4 and a time-delay closing coil D1 connected in series; the third branch is composed of a normally closed contact C3 and a time-delay closing coil D2 connected in series; the fourth branch is composed of a normally open contact C1, a normally closed contact C4, an electromagnetic coil Y2, an indicator light L2 and a time-delay closing coil D3, wherein the normally open contact C1, the normally closed contact C4, the electromagnetic coil Y2 and the indicator light L2 are connected in series, and the indicator light L2 and the time-delay closing coil D3 are connected in parallel; the fifth branch is composed of a normally open contact C3, a normally closed contact C4 and a time-delay closing coil D4 connected in series; the sixth branch is composed of an electromagnetic coil Y3 and an indicator light L3 connected in series; the seventh branch is composed of an electromagnetic coil Y4 and an indicator light L4 connected in series; the eighth branch is composed of an electromagnetic coil Y5 and an indicator light L5 connected in series; according to the control functions of each branch, the first branch, the second branch, the third branch, the fourth branch and the fifth branch connected in parallel form a first sub-control circuit, the sixth branch and the seventh branch form a second sub-control circuit, and the eighth branch forms a third sub-control circuit; the on-off the first sub-control circuit and the second sub-control circuit is controlled by an electromagnetic change-over switch S3, the default state of the electromagnetic change-over switch S3 is that the second sub-control circuit is switched on and the first sub-control circuit is switched off, and after the electromagnetic change-over switch S3 is pressed, the on-off state of the above two sub-control circuits is changed; the on-off the first sub-control circuit, the second sub-control circuit and the third sub-control circuit is controlled by an electromagnetic change-over switch S2, the default state of the electromagnetic change-over switch S2 is that the third sub-control circuit is switched off, and the first sub-control circuit and the second sub-control circuit are switched on, and after the electromagnetic change-over switch S2 is pressed, the first sub-control circuit and the second sub-control circuit are switched off, and the third sub-control circuit is switched on; and the on-off of all the branches is controlled by a normally open push switch S1;

For the aligning process of the thin-walled curved component 12, the vacuum negative pressure of the vacuum adsorption system is adjusted to 0.02-0.03 Mpa, and after the normally open push switch S1 is pressed, the electromagnetic coil Y3 and the electromagnetic coil Y4 are energized simultaneously, and the corresponding indicator light L3 and indicator light L4 come on; at this moment, the third electromagnetic directional valve 7 and the fourth electromagnetic directional valve 10 are switched from a normally closed state to a working state, and the third sub-circuit and fourth sub-circuit controlled correspondingly are simultaneously communicated with the main circuit of the pneumatic circuit; the air in the first vacuum chamber 111 is gradually pumped out through the second vacuum annular groove 114, the second horizontal air passage 121 and the second vertical air passage 118, and the vacuum degree of the vacuum chamber is gradually increased to a preset value; similarly, the air in the second vacuum chamber 112 is gradually pumped out through the third vacuum annular groove 115, the third horizontal air passage 122 and the third vertical air passage 119 to ensure that the vacuum degree of the chamber meets the requirement, and the thin-walled curved component 12 is pressed on the upper surface of the fixture but can still move under the action of external force at this moment; on this basis, trimming screws are installed in the trimming screw holes 123 to adjust the dynamic balance of the machine tool, and the aligning operation of the thin-walled curved component 12 is completed; and then the vacuum negative pressure of the vacuum adsorption system is adjusted to 0.04-0.05 Mpa, so as to fix the thin-walled curved component 12 on the vacuum adsorption fixture 11;

In the semi-precision machining stage, after the electromagnetic change-over switch S3 is pressed, the electromagnetic coil Y1 is energized, and the indicator light L1 comes on; at this moment, the first electromagnetic directional valve 6 is switched from a normally closed state to a working state, and the main circuit is communicated with the first sub-circuit; the air in the first vacuum chamber 111 is gradually pumped out through the second vacuum annular groove 114, the second horizontal air passage 121 and the second vertical air passage 118, and the vacuum degree of the first vacuum chamber 111 is rapidly increased and finally maintained at a preset value; after the action is continued for a duration of t1, the time-delay closing coil D1 is energized, the associated normally open contact C1 is closed, the electromagnetic coil Y2 is energized, the indicator light L2 comes on, and the time-delay closing coils D2 and D3 start timing simultaneously; at this moment, the second electromagnetic directional valve 9 is switched from a normally closed state to a working state, the main circuit is communicated with the second sub-circuit, the air in the second vacuum chamber 112 is gradually pumped out through the third vacuum annular groove 115, the third horizontal air passage 122 and the third vertical air passage 119, and before the cutting tool reaches the outer contour of the curved component corresponding to the first vacuum chamber 111, the vacuum degree of the second vacuum chamber 112 is adjusted to a preset value; the first sub-circuit and the second sub-circuit act simultaneously, after a duration of t2-t1, the time-delay closing coil D2 is energized, the associated normally closed contact C2 is opened, the electromagnetic coil Y1 is de-energized, the indicator light L1 goes off, the first electromagnetic directional valve 6 is reset under the action of a spring and restored to the normally closed state, and at this moment, only the second sub-circuit is communicated; subsequently, after the action is continued for a duration of t3, the time-delay closing coil D3 is energized, the associated normally open contact C3 is closed, the time-delay closing coil D4 starts timing, the associated normally closed contact C3 is opened, the time-delay closing coil D2 is de-energized, the associated normally closed contact C2 is closed, the electromagnetic coil Y1 is energized, at this moment, the first electromagnetic directional valve 6 is switched from a normally closed state to a working state, and the vacuum degree of the first vacuum chamber 111 is adjusted to a preset value; after the first sub-circuit and the second sub-circuit act simultaneously for a duration of t4, the time-delay closing coil D4 is energized, the associated normally closed contact C4 is opened, the time-delay closing coil C1 is de-energized, the associated normally open contact C1 is opened, the electromagnetic coil Y2 is de-energized, the indicator light L2 goes off, the second electromagnetic directional valve 9 is reset under the action of a spring and restored to the normally closed state, and at this moment, only the first sub-circuit is communicated; meanwhile, the normally closed contact C4 associated with the time-delay closing coil D4 is opened, the time-delay closing coil D4 is de-energized, and at this point, the control on all actions within one cutting period in the semi-precision machining stage is completed; and the time-delay closing coil D1 restarts timing, and the above action process is repeated until the control on actions of the vacuum clamping system within the next cutting period is completed;

In the precision machining stage, after the electromagnetic change-over switch S2 is pressed, the electromagnetic coil Y5 is energized, the indicator light L5 comes on, at this moment, the fifth electromagnetic directional valve 8 is switched from a normally closed state to a working state, and the main circuit is communicated with the fifth sub-circuit; the air in the first vacuum annular groove 113 is pumped out through the first horizontal air passage 120 and the first vertical air passage 117, and the upper surface of the flange of the thin-walled curved component 12 is subjected to vacuum pressure to fix the curved component on the vacuum adsorption fixture 11; and then the material removal process of the curved component in the precision machining stage is completed according to the preset cutting parameters.

The cutting time T1 is equal to the timing time t2 of the time-delay closing coil D2.

The cutting time T2 is equal to the sum of the timing time t3 of the time-delay closing coil D3 and the timing time t4 of the time-delay closing coil D4.

The present invention has the following beneficial effects:

The present invention designs a vacuum adsorption clamping system for the turning process of thin-walled curved components, and hereby proposes an adaptive clamping method for turning of thin-walled curved components. The vacuum adsorption clamping system with multiple clamping modes can be adaptively adjusted according to the main problems affecting the deformation of curved components in different process stages. In the semi-precision machining stage, the system weakens the constraint effect of the clamping boundary on stress release, so that the unbalanced stress induced by the material removal is released step by step and gradually balanced during the machining of curved components, greatly reducing the stress deformation of the components after unclamping. In the precision stage, the system can effectively control the clamping deformation of thin-walled curved components and improve the machining precision of the components. The present invention can meet the differentiated clamping demands of thin-walled curved components in different turning stages.

In the figures: 1. vacuum pump; 2. adjustable throttle valve; 3. unloading valve; 4. muffler; 5. pressure gage; 6. first electromagnetic directional valve; 7. third electromagnetic directional valve; 8. fifth electromagnetic directional valve; 9. second electromagnetic directional valve; 10. fourth electromagnetic directional valve; 11. vacuum adsorption fixture; 111. first vacuum chamber; 112. second vacuum chamber; 113. first vacuum annular groove; 114. second vacuum annular groove; 115. third vacuum annular groove; 116. mounting hole; 117. first vertical air passage; 118. second vertical air passage; 119. third vertical air passage; 120. first horizontal air passage; 121. second horizontal air passage; 122. third horizontal air passage; 123. trimming screw hole; 124. auxiliary support; 12. thin-walled curved component; and 13. rubber sealing ring.

DETAILED DESCRIPTION

Figure 1:
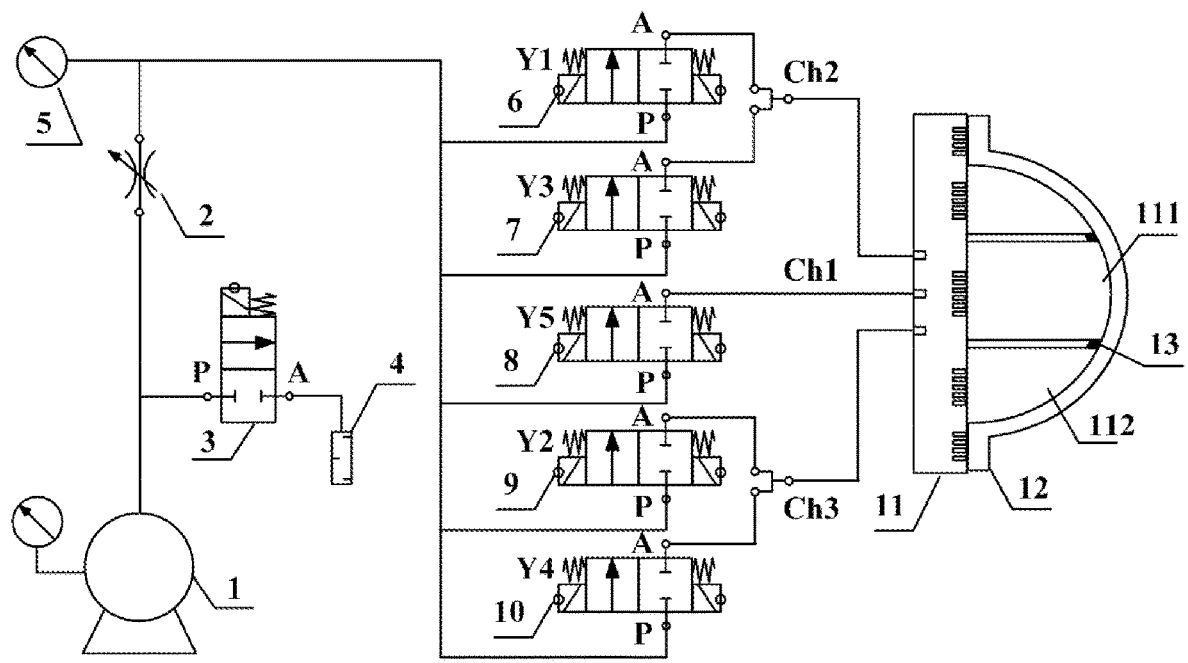
FIG. 1 is a pneumatic circuit diagram of a vacuum adsorption clamping system for thin-walled curved components.

The present invention is further described below in combination with the drawings and the specific embodiments;

A vacuum adsorption clamping system for turning of thin-walled curved components, mainly comprising a pneumatic circuit, a vacuum adsorption fixture and an electromagnetic control circuit;

The main circuit of the pneumatic circuit shown in FIG. 1 comprises a vacuum pump 1, an adjustable throttle valve 2 and a pressure gage 5 which are connected in sequence through pneumatic hoses. A first sub-circuit, a second sub-circuit, a third sub-circuit, a fourth sub-circuit and a fifth sub-circuit are respectively controlled by a first electromagnetic directional valve 6, a second electromagnetic directional valve 9, a third electromagnetic directional valve 7, a fourth electromagnetic directional valve 10 and a fifth electromagnetic directional valve 8, and the five sub-circuits are independent of each other, with one end connected with the main circuit through ferrule joints.

Figure 2:
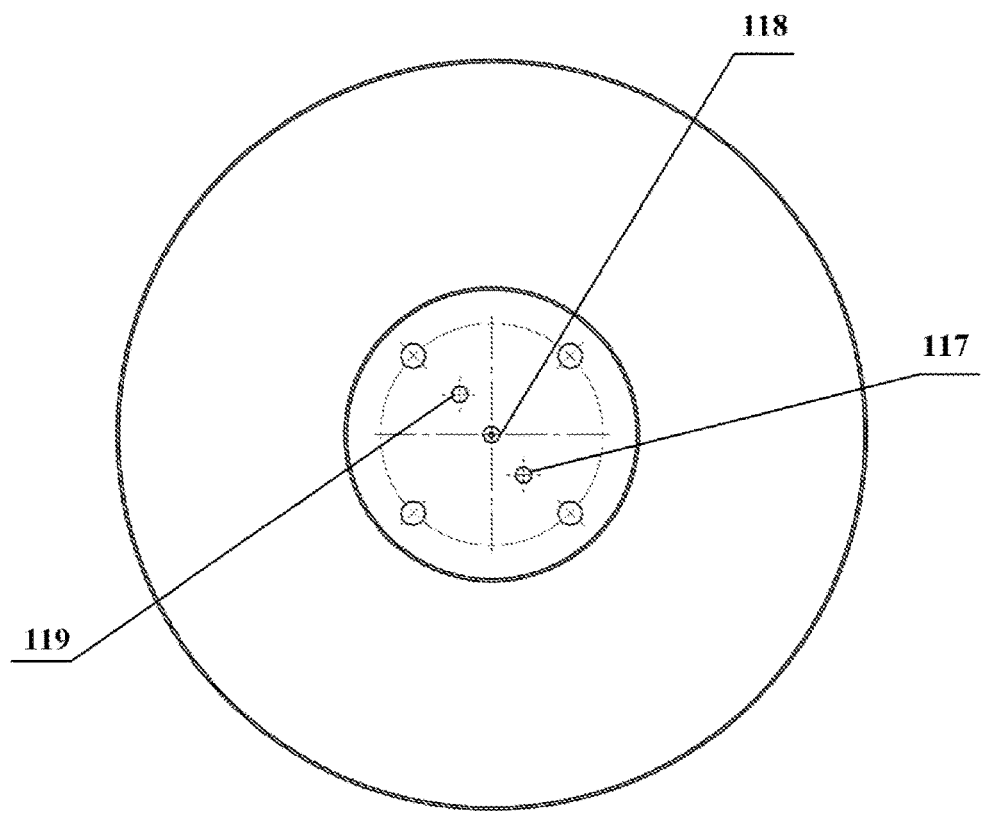
FIG. 2 is a front view of a vacuum adsorption fixture.
Figure 3:
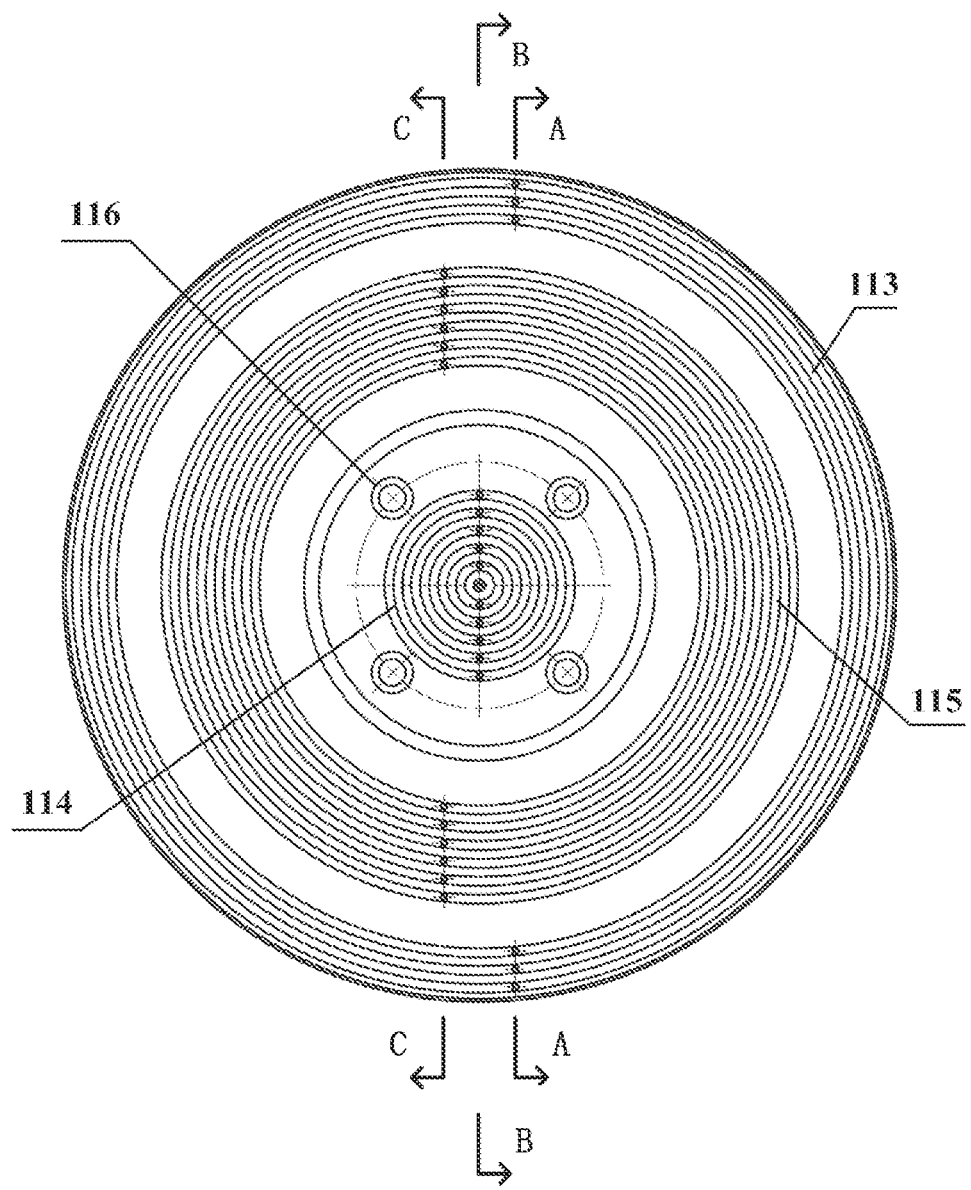
FIG. 3 is a bottom view of a vacuum adsorption fixture.
Figure 4:
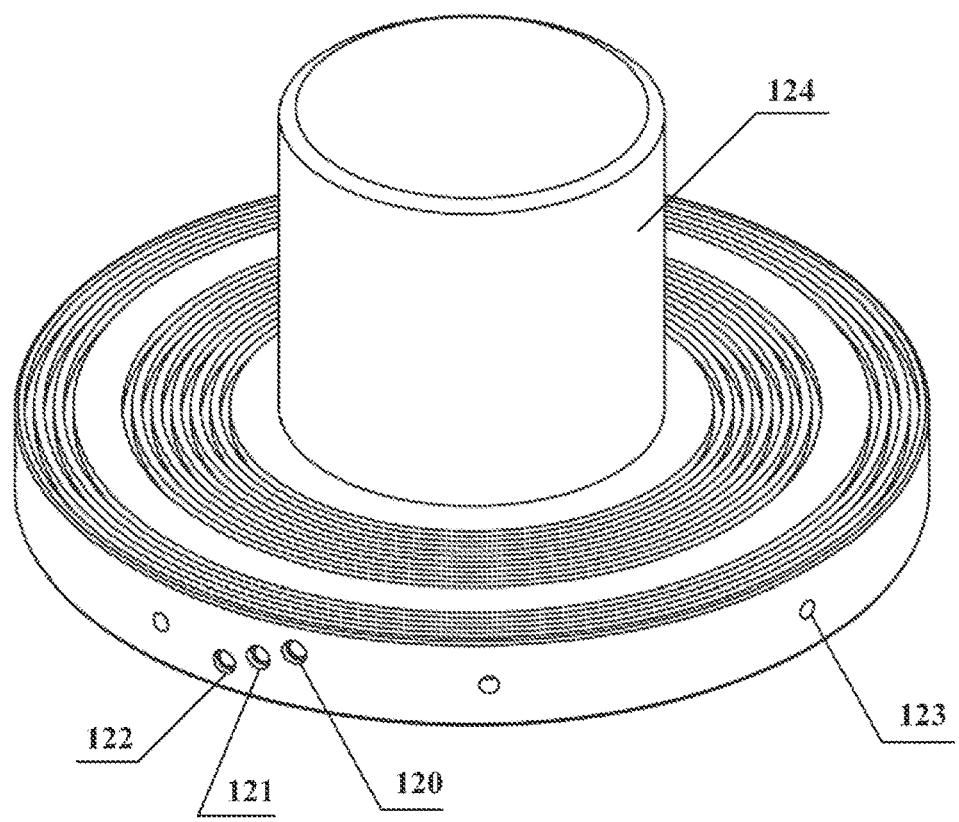
FIG. 4 is an isometric view of a vacuum adsorption fixture.
Figure 5:
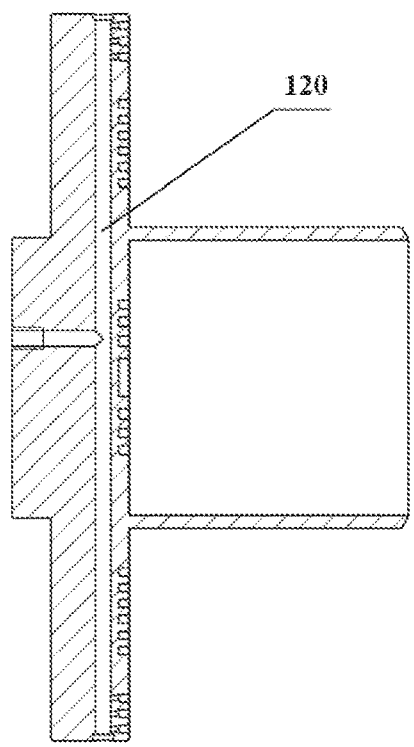
FIG. 5 is a sectional view of section A-A of a vacuum adsorption fixture.
Figure 6:
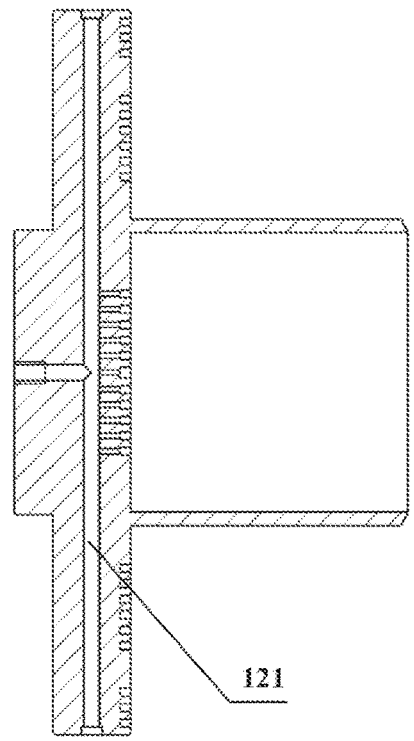
FIG. 6 is a sectional view of section B-B of a vacuum adsorption fixture.
Figure 7:
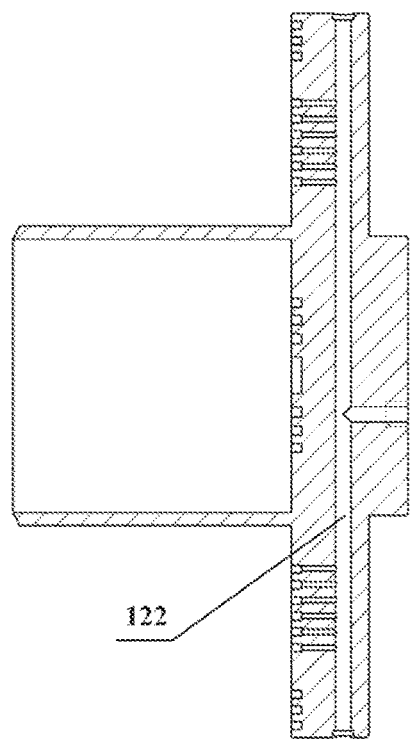
FIG. 7 is a sectional view of section C-C of a vacuum adsorption fixture.

As shown in FIG. 2, FIG. 3 and FIG. 4, the surface of the vacuum adsorption fixture 11 is provided with a first vacuum annular groove 113, a second vacuum annular groove 114 and a third vacuum annular groove 115, and a first vertical air passage 117, a second vertical air passage 118, a third vertical air passage 119, a first horizontal air passage 120, a second horizontal air passage 121 and a third horizontal air passage 122 are arranged in the vacuum adsorption fixture 11. Both ends of the horizontal air passages are sealed with plugs and respectively communicated with the corresponding vacuum annular grooves and vertical air passages, so as to form three sealed vacuum channels in the adsorption fixture, and the vacuum channels are respectively shown in FIG. 5, FIG. 6 and FIG. 7. The tail ends of the first vertical air passage 117, the second vertical air passage 118 and the third vertical air passage 119 are respectively provided with first, second and third pipe threads and connected with the sub-circuits of the pneumatic circuit through pneumatic rotary joints, wherein the first vertical air passage 117 is communicated with the fifth sub-circuit, the second vertical air passage 118 is communicated with the first sub-circuit and the third sub-circuit, and the third vertical air passage 119 is communicated with the second sub-circuit and the fourth sub-circuit. In addition, the upper surface of the vacuum adsorption fixture 11 is provided with an auxiliary support 124 and mounting holes 116, and trimming screw holes 123 are circumferentially and uniformly distributed on the side surface, wherein the height of the auxiliary support 124 is 84 mm, and a rubber sealing ring 13 is adhered to the upper surface thereof.

Figure 8A:
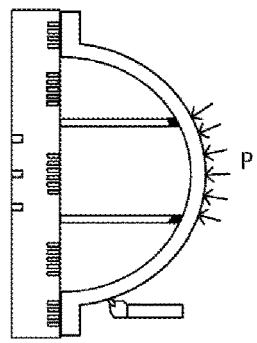
FIG. 8(a) is a schematic diagram of a first vacuum adsorption mode for clamping of thin-walled curved components.
Figure 8B:
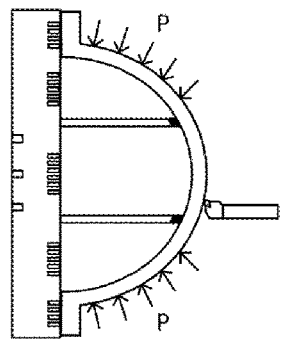
FIG. 8(b) is a schematic diagram of a second vacuum adsorption mode for clamping of thin-walled curved components.
Figure 8C:
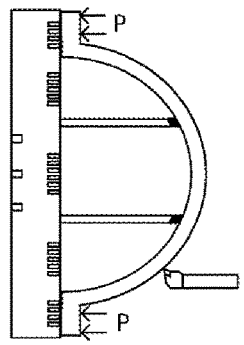
FIG. 8(c) is a schematic diagram of a third vacuum adsorption mode for clamping of thin-walled curved components.

For the turning process of thin-walled curved components, an adaptive clamping method is proposed in combination with the above vacuum adsorption clamping system, so as to meet the differentiated clamping demands of thin-walled curved components in different process stages. The thin-walled curved component is a hemispherical surface with a flange, the length of the flange is 20 mm, the thickness of the flange is 10 mm, the inner diameter of the spherical surface is 120 mm, and the wall thickness of the spherical surface is 2.8 mm. Specifically: The thin-walled curved component 12 is placed on the upper surface of the vacuum adsorption fixture 11, the runout of the component is adjusted at a low vacuum degree, and then the vacuum adsorption force is increased to fix the thin-walled curved component 12 on the vacuum adsorption fixture 11. At this moment, the rubber sealing ring 13 on the auxiliary support 124 is in contact with the inner surface of the thin-walled curved component 12 to separate the closed space formed by the inner surface of the curved component 12 and the upper surface of the fixture into two non-conductive sealed vacuum chambers, wherein the vacuum chamber away from the flange is a first vacuum chamber 111, and the vacuum chamber near the flange is a second vacuum chamber 112. On this basis, the adsorption in the first vacuum chamber is defined as a clamping mode 1, the adsorption in the second vacuum chamber is defined as a clamping mode 2, the adsorption in the flange end surface is defined as a clamping mode 3, and the clamping diagram of each mode is shown in FIG. 8.

In the semi-precision machining stage, the spindle speed is set to 700 r/min, the cutting depth is set to 10 μm, the feed is set to 20 μm/r, and the wall thickness of the thin-walled curved component 12 is reduced to 2.45 mm. The clamping mode 1 and the clamping mode 2 are selected as the clamping scheme of the thin-walled curved component 12 in the current process stage. When the tool cuts the outer contour of the curved component corresponding to the second vacuum chamber 112, the clamping mode 1 is started, and the first vacuum chamber 111 is adsorbed to complete the positioning and clamping of the thin-walled curved component 12. Similarly, when the tool cuts the outer contour of the curved component corresponding to the first vacuum chamber 111, the clamping mode 2 is started, and the second vacuum chamber 112 is adsorbed to complete the positioning and clamping of the thin-walled curved component 12. The cutting durations of the tool in the above two cases are calculated as T1=310.8 S and T2=316.1 S respectively according to the geometry of the curved component and the cutting parameters, and the automatic switching of the above two modes is realized by the electromagnetic control circuit.

In the precision machining stage, the spindle speed is set to 900 r/min, the cutting depth is set to 5 μm, the feed is set to 10 μm/r, and the wall thickness of the thin-walled curved component 12 is reduced to 2.4 mm. The clamping mode 3 is selected as the clamping scheme of the thin-walled curved component 12 in the current process stage. At this moment, the residual material to be removed is less, and the machining deformation induced by the release of unbalanced stress after unclamping has less influence on the forming precision of the curved component, so a method of flange adsorption clamping is used to reduce the vacuum adsorption clamping deformation of the thin-walled curved component 12.

After the machining is completed, the unloading valve 3 is opened to let air enter through the muffler 4 and finally fill the whole vacuum adsorption fixture 11 through the adjustable throttle valve 2, then the thin-walled curved component 12 is removed, and the vacuum system is closed.

Figure 9:
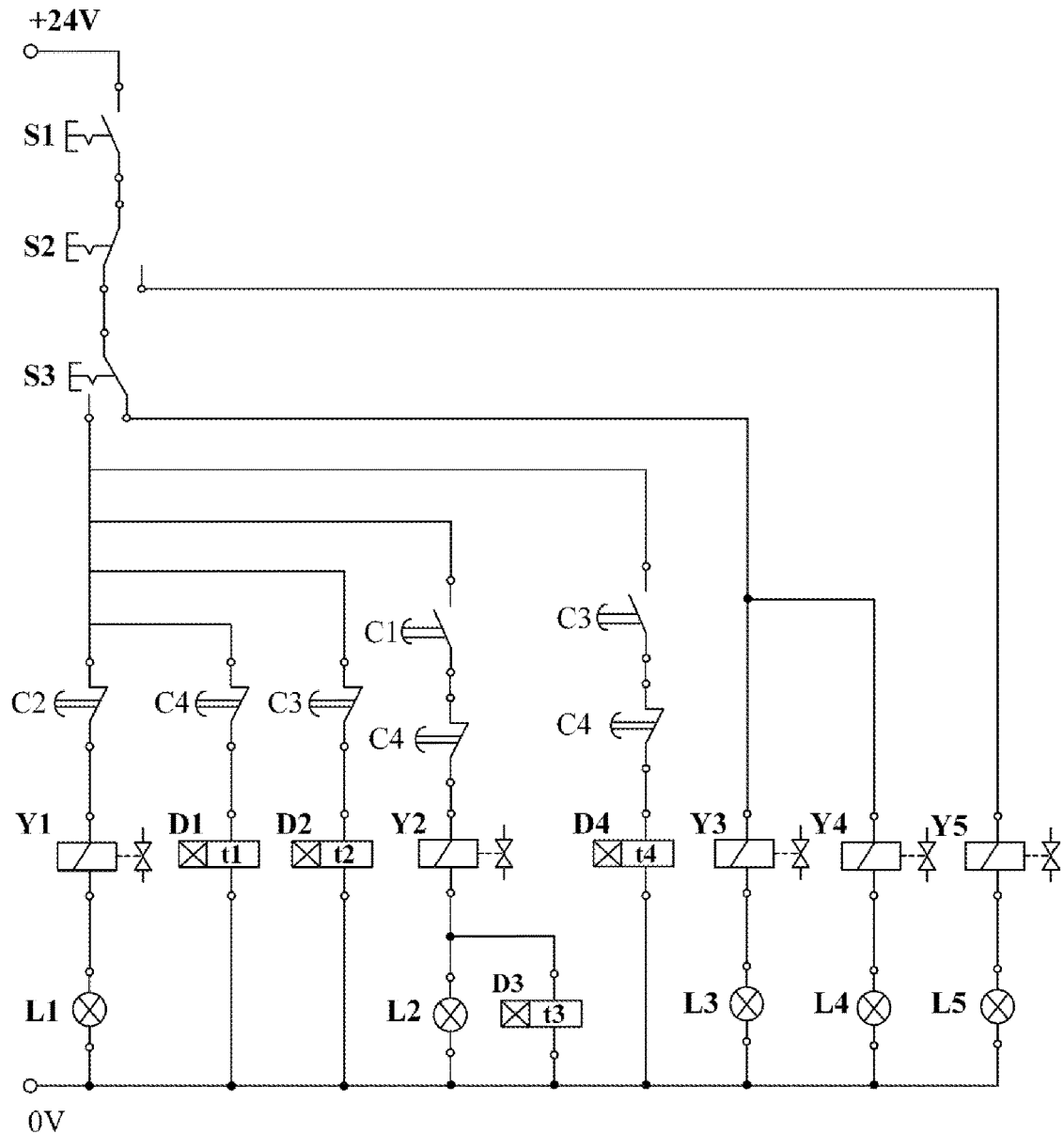
FIG. 9 is a schematic diagram of electromagnetic control of a vacuum adsorption clamping system for thin-walled curved components.

According to the above action process, the corresponding electromagnetic control circuit of the vacuum system is designed, as shown in FIG. 9. The electromagnetic control circuit of the vacuum adsorption clamping system is composed of eight branches connected in parallel in a 24 VDC power source, wherein the first branch is composed of a normally closed contact C2, an electromagnetic coil Y1 and an indicator light L1 connected in series; the second branch is composed of a normally closed contact C4 and a time-delay closing coil D1 connected in series; the third branch is composed of a normally closed contact C3 and a time-delay closing coil D2 connected in series; the fourth branch is composed of a normally open contact C1, a normally closed contact C4, an electromagnetic coil Y2, an indicator light L2 and a time-delay closing coil D3, wherein the normally open contact C1, the normally closed contact C4, the electromagnetic coil Y2 and the indicator light L2 are connected in series, and the indicator light L2 and the time-delay closing coil D3 are connected in parallel; the fifth branch is composed of a normally open contact C3, a normally closed contact C4 and a time-delay closing coil D4 connected in series; the sixth branch is composed of an electromagnetic coil Y3 and an indicator light L3 connected in series; the seventh branch is composed of an electromagnetic coil Y4 and an indicator light L4 connected in series; and the eighth branch is composed of an electromagnetic coil Y5 and an indicator light L5 connected in series. According to the control functions of each branch, the first branch, the second branch, the third branch, the fourth branch and the fifth branch connected in parallel form a first sub-control circuit, the sixth branch and the seventh branch form a second sub-control circuit, and the eighth branch forms a third sub-control circuit. The on-off the first sub-control circuit and the second sub-control circuit is controlled by an electromagnetic change-over switch S3, the default state of the electromagnetic change-over switch S3 is that the second sub-control circuit is switched on and the first sub-control circuit is switched off, and after the electromagnetic change-over switch S3 is pressed, the on-off state of the above two sub-control circuits is changed. The on-off the first sub-control circuit, the second sub-control circuit and the third sub-control circuit is controlled by an electromagnetic change-over switch S2, the default state of the electromagnetic change-over switch S2 is that the third sub-control circuit is switched off, and the first sub-control circuit and the second sub-control circuit are switched on, and after the electromagnetic change-over switch S2 is pressed, the first sub-control circuit and the second sub-control circuit are switched off, and the third sub-control circuit is switched on. The on-off of all the branches is controlled by a normally open push switch S1.

For the aligning process of the thin-walled curved component 12, the vacuum degree of the vacuum pump 1 is adjusted to a smaller value, and after the normally open push switch S1 in the electromagnetic control circuit is pressed, the electromagnetic coil Y3 and the electromagnetic coil Y4 are energized simultaneously, and the corresponding indicator light L3 and indicator light L4 come on. At this moment, the third electromagnetic directional valve 7 and the fourth electromagnetic directional valve 10 are switched from a normally closed state to a working state, and the third sub-circuit and fourth sub-circuit controlled correspondingly are simultaneously communicated with the main circuit of the pneumatic circuit. The air in the first vacuum chamber 111 is gradually pumped out through the second vacuum annular groove 114, the second horizontal air passage 121 and the second vertical air passage 118, and the vacuum degree of the vacuum chamber is gradually increased to a preset value. Similarly, the air in the second vacuum chamber 112 is gradually pumped out through the third vacuum annular groove 115, the third horizontal air passage 122 and the third vertical air passage 119 to ensure that the vacuum degree of the chamber meets the requirement, and the thin-walled curved component 12 is pressed on the upper surface of the fixture but can still move under the action of external force at this moment. On this basis, trimming screws are installed in the trimming screw holes 123 to adjust the dynamic balance of the machine tool, and the aligning operation of the thin-walled curved component 12 is completed. Then the vacuum degree of the vacuum pump 1 is increased, and the vacuum adsorption force is increased to fix the thin-walled curved component 12 on the vacuum adsorption fixture 11.

In the semi-precision machining stage, after the electromagnetic change-over switch S3 is pressed, the electromagnetic coil Y1 is energized, and the indicator light L1 comes on. At this moment, the first electromagnetic directional valve 6 is switched from a normally closed state to a working state, and the main circuit is communicated with the first sub-circuit. The air in the first vacuum chamber 111 is gradually pumped out through the second vacuum annular groove 114, the second horizontal air passage 121 and the second vertical air passage 118, and the vacuum degree of the first vacuum chamber 11I is rapidly increased and finally maintained near a preset value. After the action is continued for a duration of 300 s, the time-delay closing coil D1 is energized, the associated normally open contact C1 is closed, the electromagnetic coil Y2 is energized, the indicator light L2 comes on, and the time-delay closing coils D2 and D3 start timing simultaneously. At this moment, the second electromagnetic directional valve 9 is switched from a normally closed state to a working state, the main circuit is communicated with the second sub-circuit, the air in the second vacuum chamber 112 is gradually pumped out through the third vacuum annular groove 115, the third horizontal air passage 122 and the third vertical air passage 119, and before the cutting tool reaches the outer contour of the curved component corresponding to the first vacuum chamber 111, the vacuum degree of the second vacuum chamber 112 is adjusted near a preset value. After the first sub-circuit and the second sub-circuit act simultaneously for a duration of 10.8 s, the time-delay closing coil D2 is energized, the associated normally closed contact C2 is opened, the electromagnetic coil Y1 is de-energized, the indicator light L1 goes off, the first electromagnetic directional valve 6 is reset under the action of a spring and restored to the normally closed state, and at this moment, only the second sub-circuit is communicated. After the action is continued for a duration of 300 s, the time-delay closing coil D3 is energized, the associated normally open contact C3 is closed, the time-delay closing coil D4 starts timing, the associated normally closed contact C3 is opened, the time-delay closing coil D2 is de-energized, the associated normally closed contact C2 is closed, the electromagnetic coil Y1 is energized, at this moment, the first electromagnetic directional valve 6 is switched from a normally closed state to a working state, and the vacuum degree of the first vacuum chamber 111 is adjusted near a preset value. After the first sub-circuit and the second sub-circuit act simultaneously for a duration of 16.1 s, the time-delay closing coil D4 is energized, the associated normally closed contact C4 is opened, the time-delay closing coil C1 is de-energized, the associated normally open contact C1 is opened, the electromagnetic coil Y2 is de-energized, the indicator light L2 goes off, the second electromagnetic directional valve 9 is reset under the action of a spring and restored to the normally closed state, and at this moment, only the first sub-circuit is communicated. Meanwhile, the normally closed contact C4 associated with the time-delay closing coil D4 is opened, the time-delay closing coil D4 is de-energized, and at this point, the control on all actions within one cutting period in the semi-precision machining stage is completed. The time-delay closing coil D1 restarts timing, and the above action process is repeated until the control on actions of the vacuum clamping system within the next cutting period is completed.

In the precision machining stage, after the electromagnetic change-over switch S2 is pressed, the electromagnetic coil Y5 is energized, the indicator light L5 comes on, at this moment, the fifth electromagnetic directional valve 8 is switched from a normally closed state to a working state, and the main circuit is communicated with the fifth sub-circuit. The air in the first vacuum annular groove 113 is pumped out through the first horizontal air passage 120 and the first vertical air passage 117, and the upper surface of the flange of the thin-walled curved component 12 is subjected to vacuum pressure to fix the curved component on the vacuum adsorption fixture 11. Then the material removal process of the curved component in the precision machining stage is completed according to the preset cutting parameters.

The invention claimed is:
1. A clamping system for turning of thin-walled curved components, comprising a pneumatic circuit, a vacuum adsorption fixture and an electromagnetic control circuit; the pneumatic circuit comprises a main circuit and five sub-circuits, and the main circuit comprises a vacuum pump, an adjustable throttle valve and a pressure gauge connected in sequence through pneumatic hoses, and an unloading valve and a muffler connected in sequence are connected in parallel between the vacuum pump and the adjustable throttle valve; and the five sub-circuits are a first sub-circuit, a second sub-circuit, a third sub-circuit, a fourth sub-circuit and a fifth sub-circuit which are respectively controlled by a first electromagnetic directional valve, a second electromagnetic directional valve, a third electromagnetic directional valve, a fourth electromagnetic directional valve and a fifth electromagnetic directional valve, and the five sub-circuits are independent of each other and are connected with the main circuit through ferrule joints;
a surface of the vacuum adsorption fixture is provided with three vacuum annular grooves, which are a first vacuum annular groove, a third vacuum annular groove and a second vacuum annular groove from outside to inside; a first vertical air passage, a second vertical air passage, a third vertical air passage, a first horizontal air passage, a second horizontal air passage and a third horizontal air passage are arranged in the vacuum adsorption fixture, wherein the axis of the second vertical air passage coincides with a rotation axis of the vacuum adsorption fixture, and the first vertical air passage and the third vertical air passage are respectively located on both sides of the second vertical air passage; the axis of the second horizontal air passage intersects with and is perpendicular to the rotation axis of the vacuum adsorption fixture, and the first horizontal air passage and the third horizontal air passage are respectively located on both sides of the second horizontal air passage; the axis of each vertical air passage intersects with and is perpendicular to the axis of a corresponding horizontal air passage; both ends of the horizontal air passages are sealed with plugs, each of the horizontal air passages communicate with a respective vacuum annular groove and respectively communicated with the corresponding vacuum annular grooves and vertical air passages, so as to form three sealed vacuum channels in the adsorption fixture; the first vertical air passage is communicated with the fifth sub-circuit, the second vertical air passage is communicated with the first sub-circuit and the third sub-circuit, and the third vertical air passage is communicated with the second sub-circuit and the fourth sub-circuit; and an upper surface of the vacuum adsorption fixture is provided with an auxiliary support and mounting holes, and screw holes are circumferentially and uniformly distributed on a side surface, wherein a rubber sealing ring is adhered to an upper surface of the auxiliary support.

2. The clamping system for turning of thin-walled curved components according to claim 1, wherein the electromagnetic directional valves are normally closed two-position two-way valves.

3. The clamping system for turning of thin-walled curved components according to claim 1, wherein the ferrule joints are made of stainless steel.

4. The clamping system for turning of thin-walled curved components according to claim 1, wherein tail ends of the vertical air passages are provided with pipe threads and connected with their respective sub-circuit through pneumatic rotary joints.

5. The clamping system for turning of thin-walled curved components according to claim 1, wherein the first sub-circuit and the third sub-circuit are connected together through a three-way ferrule joint.

6. The vacuum adsorption clamping system for turning of thin-walled curved components according to claim 1, wherein the second sub-circuit and the fourth sub-circuit are connected together through a three-way ferrule joint.

* * * * *